UNITED STATES PATENT OFFICE.

AUSTIN G. DAY, OF NEW YORK, N. Y.

IMPROVEMENT IN PREPARING VEGETABLE OILS FOR THE MANUFACTURE OF KERITE.

Specification forming part of Letters Patent No. 210,410, dated December 3, 1878; application filed June 2, 1877.

CASE G.

*To all whom it may concern:*

Be it known that I, AUSTIN G. DAY, of the city, county, and State of New York, have invented an Improvement in Preparing Vegetable Oils for use in the Manufacture of the compound termed "Kerite," referred to in Letters Patent of the United States granted to me, of even date herewith; and I hereby declare that the following is a full, clear, and exact description of the same.

The object of this invention is to secure greater cohesiveness and a better and tougher elasticity in the oils, thereby enabling a more perfect result to be obtained in the kerite, and, when the latter is to be combined with natural india-rubber, diminishing the proportion of rubber required to make a good product.

It is, in effect, a new combination of the agents and methods which I employ in the processes described in my other patents for making the crude kerite; and it consists in preparing the vegetable oils for use in the subsequent stages of the complete process by subjecting them to the action of sulphur at a high temperature before they are combined with the resinous body or bodies or other ingredients of the kerite.

To enable others to put my improvement into practice, I will describe the method of working it which I have found successful.

I usually take for a convenient working batch of materials, say, thirty pounds of cotton-seed oil, of a good quality, and heat it gradually in any suitable vessel to about 600° Fahrenheit, preferring to cause it to be about two hours in reaching this temperature, though it may be run up to it more quickly if desired. I keep it at this point during about five hours, and then cool it, preferably letting it stand over night for that purpose. I next heat it to about 200° to 220° Fahrenheit, and at this temperature add to it about two to four pounds of sulphur, and run up the heat of the mixture, during about two hours, to, say, 550° Fahrenheit, and keep it there for about five hours. I then let it cool, preferably over night, as before, and when cooled it will be ready to be mixed with the tars in the manner described in my other patents above referred to. I also take about thirty pounds of linseed-oil of a good quality, heat it gradually in any convenient vessel during about two hours to 520° Fahrenheit, or thereabout, keep it at that temperature for about four hours, and then cool it, as in the case of the cotton-seed oil. I next heat it to from 200° to 220° to 230° Fahrenheit, and add to it from one to three pounds of sulphur, and run the mixture, during about two hours, up to, say, 450° to 475° Fahrenheit, and keep it at that temperature for about four hours. I then cool it as before. When cooled it will be in proper condition to be mixed with the combination of the tars and cotton-seed oil treated as above, the tars and cotton-seed oil being first combined, and then the linseed-oil mixed with the compound.

If the oil taken be made from seed of inferior quality, the times for continuing the heats will require to be somewhat longer than those given above.

If desired, the linseed-oil and sulphur, instead of being thus treated, may be added to the mixture of cotton-seed oil and sulphur after the latter has been cooled as described, and then the whole mass may be heated up to about 550° Fahrenheit, for from two to three hours, until a thorough union of the ingredients takes place; or the two oils may be mixed together, the sulphur—say, four to five pounds—added, and the ingredients incorporated at a heat which should be gradually carried to about 550° to 600° Fahrenheit during five to nine hours. Either of these two last-specified methods of treatment will answer the purpose, but neither will make a product of so excellent a quality as the method first above set forth.

It will be noticed that in each of these examples the proportion of sulphur is small. A somewhat larger amount may, however, be employed, in which event more time may be allowed for the union of the ingredients.

By treating the oils in either of the above-mentioned modes they will, when cooled, be found in a state of preparation adapted to produce in the finished kerite the improved qualities which have been referred to. Other vegetable oils—such as castor-oil or olive-oil—may be employed in this process, the heat at which they are to be combined with the sulphur being adapted to the nature of the particular oil selected. Thus castor-oil requires a somewhat higher heat for this purpose than cotton-seed or linseed oil, but in each case the proper temperature can be readily determined in practice.

The proportion of the vegetable oils herein specified is made slightly larger than that prescribed in my said patents of even date herewith for a working batch of materials, for the reason that in the preliminary treatment of the oils here directed some waste will necessarily occur; but the proportionate quantity remaining after the preliminary treatment is completed will be about the same as is called for by my other patents, and after the oils have been treated as here directed the remainder of the process for completing the kerite should be in all respects similar to that set forth in said patents, except that the proportion of sulphur employed for vulcanization after the oils have been combined with the resinous and other ingredients should be lessened by as much as was used for the preparatory sulphurization of the oils.

It will be seen that the distinctive feature of this improvement is the partial vulcanization of the oils with a small proportion of sulphur at an extremely high temperature as a preparation for combining them with the other ingredients of my kerite processes. I have found by the use of it that there results in the kerite a greatly-increased tenacity and compactness, a more reliable elasticity, and in general a closer approach to the qualities of natural india-rubber. It has therefore enabled me to overcome most of the defects of my earlier kerite compounds, and it provides a product which can be combined with natural rubber with very great economy and success.

By the use of it I am also able to employ a much larger proportion of kerite with the natural rubber than heretofore—a result which is of great importance in diminishing the cost of rubber fabrics; and the time hitherto required for combining the ingredients together to form the kerite is, in consequence of the preliminary partial sulphurization of this process, shortened nearly one-half.

I do not claim, broadly, the combination of sulphur with vegetable oils, as that has been done in forming varnishes and in ordinary vulcanized rubber.

Having thus made known my invention, what I claim as new, and desire to secure by Letters Patent, is—

The process of preparing vegetable oils for use in forming kerite compounds by subjecting such oils to the action of sulphur at a high temperature, substantially as described.

AUSTIN G. DAY.

Witnesses:
JOHN J. DIXON,
A. J. DE LACY.